Sept. 6, 1966          J. W. EVANS          3,270,564
ATHLETIC SWING MEASUREMENT SYSTEM
Filed May 18, 1964          2 Sheets-Sheet 1
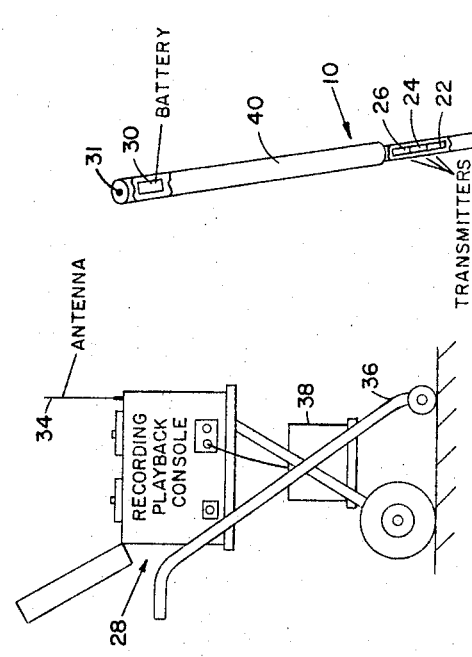
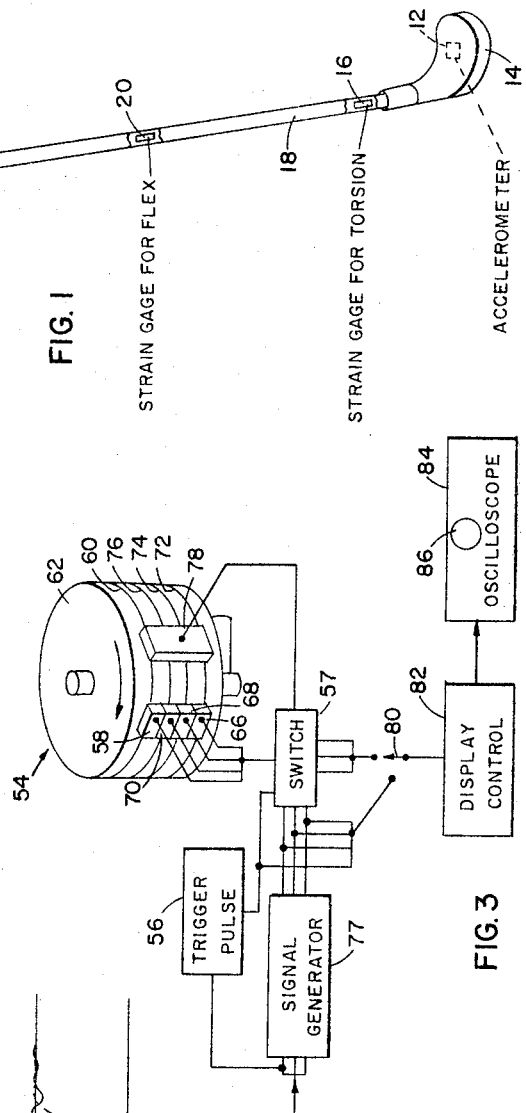
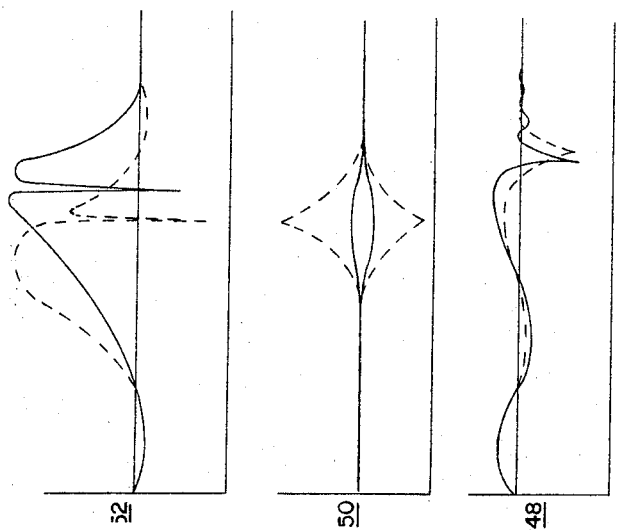
James W. Evans,
INVENTOR
Charles A. Phillips
ATTORNEY Sept. 6, 1966          J. W. EVANS          3,270,564

ATHLETIC SWING MEASUREMENT SYSTEM

Filed May 18, 1964          2 Sheets-Sheet 2

James W. Evans,
INVENTOR

BY Charles A. Phillips

ATTORNEY

United States Patent Office 3,270,564
Patented Sept. 6, 1966

3,270,564
ATHLETIC SWING MEASUREMENT SYSTEM
James W. Evans, 1718 Laverne Drive, Huntsville, Ala.
Filed May 18, 1964, Ser. No. 368,000
22 Claims. (Cl. 73—432)

This invention relates to apparatus for the measurement of characteristics of the swing of a bat or club, such as, for example, a golf club.

In athletic games wherein a bat or club is used to strike an object such as a ball, it is axiomatic that the degree of success is largely dependent upon the swing or stroke employed. This is overwhelmingly the case with golf and much has been written descriptive of what a perfect golf swing should comprise. The difficulty in the past has been that of comparing the actual swing in a given case with the perfect swing. This difficulty in turn, arises from the difficulty of observation of a golf swing due to the inability of the eye to capture the precise movement of a golf club during the stroke. This difficulty is well recognized and in efforts to overcome it a number of techniques and devices have been devised to electrically and mechanically measure relevant parameters. Examples of these are illustrated as follows: In Fox Patent 1,876,657 which describes means involving a yieldable club face for indicating the degree of impact with a ball; Walker Patent 2,630,012, Lathrop Patent 3,088,321 and Kirkman Patent 3,106,403 showing various means of indicating golf club velocities; Chedister Patent 3,037,777 directed to means for determining the direction of a stroke; and Alvarez Patent 2,852,569 which describes means for assisting a golfer in determining both the direction and velocity of a swing. Recently it is understood that high speed motion picture photography has been employed in an effort to more precisely capture details of golf swings.

While the foregoing devices and techniques have in general provided useful means of gathering information of value, it is the experience of the applicant that too often informaion as would have been thus obtained is fragmentary and difficult to analyze and not readily translatable into usable form. For example as a teaching aid, measurements should be accomplished not only without distraction but instantly and where employed to perform the role of analysis for the purpose of choosing a proper club, measurement data must be extensive and must be thoroughly correlated. These are believed shortcomings of the priot art.

It is, accordingly, the object of the present invention to provide a novel system for measuring athletic swings in general, and particularly golf swings, which is substantially more complete than previously employed and provides means without distraction, of obtaining quickly, precisely, and conveniently, data which may be readily analyzed to correct defects in one's swing, and also provide a relatively complete basis for the selection of the proper club for an optimum swing.

In accordance with the present invention means are provided for making one or more of several measurements along the club during the course of a stroke which have been found significant in analyzing stroke characteristics. These measurements, which are electrically obtained, are then transmitted either by radio or by wire means to a remote console which includes means for registering them continuously thruout a stroke and correlating them directly with time, thus the system provides a complete analysis of the particular measurement or measurements made at each instance of significance thruout the stroke. Means are also provided for displaying this data for immediate examination or subsequent analysis.

These measurements, include not only velocity, which has previously been examined, but generally uncorrelated with respect to time, but also twisting or torsion of the golf head with respect to the club handle, and the flex or bending of the handle thruout a stroke.

Other features, objects, and advantages of the invention will be apparent from a reading of the following description and claims, when considered in conjunction with the accompaning drawings in which:

FIG. 1 is a pictorial illustration of one embodiment of the invention;

FIG. 3 is a schematic illustration, partly in block form, of a one cycle recorder, shown as one of the blocks in FIG. 2; and FIG. 4 illustrates a series of curves representative of information obtainable by means of the invention.

Figure 2:
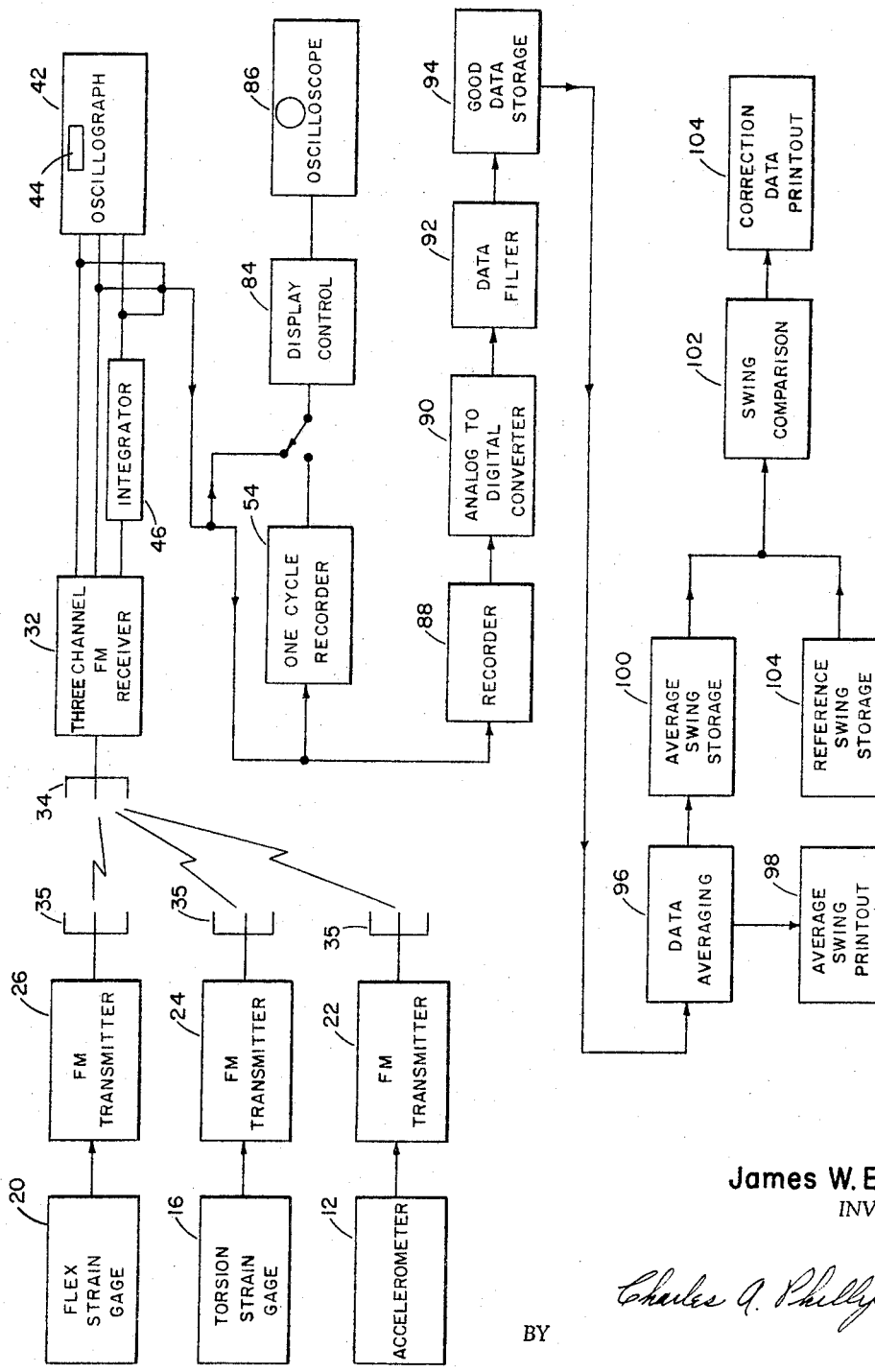
FIG. 2 is a block electrical diagram of a more complete presentation of an embodiment of the invention.

Referring first to FIG. 1, golf club 10 is fabricated with accelerometer 12 mounted in or to club head 14, strain gage 16 positioned within or to shaft or handle region 18 fairly close or adjacent to club head or club region 14, and strain gage 20 attached further up shaft 18. Each of these measurement devices are adapted to electrically provide an appropriate indication of movement, accelerometers 12 indicating acceleration (which may be read out directly or converted to velocity) encountered by club head 14, strain gage 16 oriented to indicate twisting or torsion of handle 18 at generally the principal point of twisting, and strain gage 20 oriented and positioned to measure bending of shaft or handle 18 in the general region of maximum bending and in the plane of direction of maximum motion, that of the general plane of swing. Electrical outputs of these instruments, or instruments providing a like function, modulate, respectively, F.M. (frequency modulation) transmitters 22, 24, and 26 which are generally located in the upper or handle region of club 10. These transmitters, transmit on different frequencies (a multiplex system of a known type may be employed to transmit all instrument outputs on a single radio frequency carrier) to recording/playback console 28, transmitting outputs of accelerometer 12, strain gage 16 and strain gage 20, respectively. The instrumentation and transmitters contained in golf club 10 are powered in a conventional manner by means of battery 30 positioned near the upper end of club 10, that is in the gripping region of club 10. Battery 30 is removable and replaceable by means of removable plug 31.

Recording/playback console 28 includes a three channel F.M. receiver 32 for receiving signals via antenna 34, illustrated as one of the elements shown in block form in FIG. 2. Transmitting antenna 35 may simply be the shaft of golf club 10. Recording/playback console 28 is mounted on carriage 36 and powered by means of battery 38. While radio transmission means are illustrated as providing the connection between the instrumentation of golf club 10 and recording/playback console 28, a cable link can be employed as well, in which case the cable would connect between console 28 and the gripping end 40 of golf club 10 with plug 31 being typically replaced by an electrical plug which may then provide a plug-in connection for other clubs. Battery power may then come from battery 38 of console 36.

Referring now to FIG. 2 the outputs of accelerometer 12, strain gage 16, and strain gage 20 are appropriately connected to modulate transmitters 22, 24 and 26 operating on different frequency channels and the outputs of these transmitters are picked up by a three channel F.M. receiver 32 as stated above. F.M. transmitters 22, 24 and 26 are conventional and may be transistorized voltage controlled oscillators, the control voltage being derived from battery energized strain gages 16 and 20 and voltage outputs of crystal self-generating accelerometer 12. The outputs of receiver 32 are connected to appropriate inputs of a conventional recording oscillograph 42 having a channel presentation for each of the inputs. In this manner the curves illustrated in FIG. 4 may be traced as a presentation on a paper print-out 44 of oscillograph 42. The acceleration input signal, derived from accelerometer 12, is first integrated in integrator 46 to provide a velocity signal to oscillograph 42 (if desired the acceleration signal may be retained as a supplemental channel of information) which is illustrated in FIG. 4 as curve 48. A torsion signal is illustrated by curve 50 and a bending or flexure signal by curve 52. Recording/playback console 28 includes as an alternate to an oscillograph 42, or in addition thereto, a one-cycle magnetic recorder 54 shown in somewhat greater detail in FIG. 3.

At the initiation of the back swing of a golf stroke, that is when the club is moved to raise it to the point of beginning of a swing of the club toward a golf ball, a negative direction acceleration signal, as an initiation signal, derived from accelerometer 12, is transmitted thru F.M. transmitter 22 and F.M. receiver 32 to integrator 46. This initiation signal may also be derived by other means such as by a gravity or acceleration switch in head 14. With one cycle recorder 54 in operation a trigger pulse is developed by trigger pulse circuit 56 which is responsive to a velocity signal from integrator 46, or by other means such as the switch mentioned above which may turn on one or more of transmitters 22, 24, and 26, representative of the initiation of a reverse stroke motion by club 10. Trigger pulse circuit 56 applies this pulse thru switch 57 and trigger pulse magnetic recording/playback head 58 to magnetic recording track 60, a magnetizable wire extending around and supported by continuous rotating track supporting drum 62. At the same instance, trigger pulse circuit 56 energizes switch 57 to permit signal inputs representative of velocity, torsion and flexure to be applied to recording/playback heads 66, 68, and 70, respectively. In turn, head 66 records on wire track 72, head 68 on track 74, and head 70 on track 76. These signals are provided by tone signal or carrier generator 77 which receives input signal information from receiver 32, including direct current information, and provides audio tone signals which are of an amplitude corresponding to the input signals but more readily recorded than the original signals due to presence of the direct current information. At the time that switch 57 is energized it also applies thru means not shown, a magnetic erase signal to erase 78 to clear track 60 as well as the other recording tracks so that the tracks will be clear for recording. The direction of movement of drum 62 is clockwise and is such that erasure occurs just prior to recording.

Switch 57 includes means for remaining energized for one second or such other predetermined time as will accommodate a full golf stroke cycle (back and forward stroke) which period coincides with a full revolution of drum 62. Thus, recording will continue for a full stroke cycle. In the event of a false start, or short stroke, and the club is raised and the stroke recommenced, a new trigger pulse is received by trigger pulse circuit 56 and switch 57 resets for another one second period of recording. The result is that the previous false start will be erased and the new stroke recorded in its place.

At the end of a golf swing, and the one second period, switch 57 disconnects signal modulated outputs of generator 79 and trigger pulse circuit 56 from the recording/playback heads and disables erase head 78. At the same instant switch 57 connects record/playback heads 58, 66, 68 and 70 thru selector switch 80 and display control selector 82 to oscilloscope 84 for playback operation. Selector switch 80 provides means for alternately energizing oscilloscope 84 directly, that is recorder 54 is by-passed and signals are displayed as the swing occurs. Display control 82 provides means of feeding any one of the measurement signals to oscilloscope 84, with the trigger pulse from track 60 (or from trigger pulse circuit 56 if recorder 54 is by-passed) serving as a triggering pulse for initiating a conventional horizontal sweep circuit in oscilloscope 84 to produce a one second trace on cathode ray tube 86 of oscilloscope 84. Thus any one of curves 48, 50 or 52 may be observed at will. As drum 62 continues to turn, signals played back provide a trace observable on oscilloscope 84 and may be played over and over as desired. In this way, just after a stroke is completed, a golfer can examine carefully the characteristics of his stroke and upon detecting needed changes, immediately swing again, recording his new swing. Then in a matter of seconds he can examine his second stroke and observe his degree of improvement, or failure to improve. By this system improvements are much more rapidly obtained.

Recording/playback console 28 includes alternately or in addition to oscillograph 42, one-cycle recorder 54, display control 82, and oscillograph 84, magnetic recorder 88 which is adapted to record for an extended period to allow the recording of a plurality of strokes. Recorder 88 is adapted to record four channels of information simultaneously as in the case of recorder 54. After the recording of a plurality of strokes by recorder 88, its output (or outputs) are played back (by recorder 88 or remote playback means, located for example, at a computation center, in which case the circuitry shown in FIG. 2 subsequent to recorder 88 would likewise, in a typical case, be remotely located) to analog digital converter 90 which translates one or more of curves 48, 50, and 52 into digital form having digital value points at $\frac{1}{10}$ second or smaller period intervals.

The output of converter 90 is fed to data filter 92 which includes means for comparing each one second cycle period, which occurs between trigger pulses, with a master or reference pulse, and discards noise or other information such as a false start, and feeds an output to good-data storage means 94 which records acceptable, complete stroke records. The output of good-data storage means 94 is then fed to data averaging computer 96 which averages one or more of a plurality of curves 48, 50, or 52, respectively, to provide an average velocity, torsion and/or flexure curve for an individual golfer. This average is available as a print-out thru average swing print-out circuit 98. The print-out may be in numerical, graphical or word form. Also, if desired, an output of data averaging computer 96 can be converted to analog form and played back thru oscilloscope 86.

One output of data averaging computer 96 is fed to average swing storage circuit 100, such as a tape recorder, and on demand it is fed to swing comparison circuit 102 to which is also fed an ideal stroke representation of one or more of velocity, torsion, or flexure signals. The ideal stroke signals stored in reference swing storage 104 (e.g. a tape recorder) are those, for example, derived from recorded swings of recognized successful golfers. Swing comparison circuit 102 then provides a comparison of the golfer's swing being measured with the professional reference swing and computes correction data which is printed out by correction data print-out 104. The form of correction data print-out may be as desired, as in the case of averaging swing print-out circuit 98. For example, in accordance with present day computer techniques, actual print-outs in English of the desired corrections that should be made to one's golf swing as well as indications as to incorrect weight of club, ratio of head to club weight, stiffness of club shaft and a variety of other bits of information which may be readily gleaned from measurements made in accordance with the invention.

Referring now to the curves shown in FIG. 4, the solid line in curve 52 is illustrative generally of an ideal velocity curve wherein there is initially a reverse velocity which may vary somewhat during the back stroke and then during the forward stroke a continued increase of velocity up until the moment of impact by the club head with the golf ball, indicated by the sudden drop, and slight reversal, in velocity shown. A common fault that has been found is shown in the dashed line wherein contact with the ball does not occur until there has been a significant decrease in velocity.

In the case of torsion curve 50, among the defects which may be readily observed, is that of striking the ball at the wrong point on the club head. Ideally there should occur very little torque when a ball is hit properly. Thus an ideal curve would be straight up until the point of impact and then there should be little indicated positive torque or negative (downward) torque, that is torque should fall within the enclosed portion of curve 50. Too often, however, a ball is hit near the toe of the club and thus the excessive positive torque indicated by the upper dashed line. In other instances, the ball is struck on the heel of the club head and thus the lower dashed line. The wavy line indicates some flutter of head and a defect in grip or lack of stiffness of club.

Curve 48, illustrative flexure or bending, provides data as to correct stiffness of the handle or club shaft chosen. For example, there is initially a forward bending during the back stroke, then a negative bending (opposite to direction of swing), then there should be a positive bend, that is a bend toward the ball during the stroke up until impact (or very close) with the ball, as illustrated in the solid line. Here again, it has been found that not infrequently the dashed curves occur indicating a negative bending prior to impact. While in part this may be due to a loss in velocity or deceleration, prior to impact, this may be determined by examination of curve 48 for the same individual and if there is no loss in velocity, a negative going curve prior to impact on the part of curve 48 would indicate that a handle has been chosen which is insufficiently stiff or else a greater club head to overall club weight should be chosen to obtain a greater momentum on the part of the club head.

While only one strain gage is indicated for the purpose of measuring bend and one for measuring torsion, additional ones may be employed at different positions along the club handle to increase the amount of data available for examination. Similarly, instead of employing a single accelerometer in club head 14, for detecting acceleration along the direction normal to the club face, additional accelerometers may be employed to detect acceleration and measure velocity and thus in other directions to measure departures from the ideal stroke direction. For example, by placing two additional accelerometers a like angle either side of a line normal to the face of the golf club, directional departures can readily be measured. In fact, if desired, the first accelerometer may be omitted in which case actual velocity direction may be resolved from the difference of output of the angular positioned accelerometers. In addition, an electrically indicating inclinometer or level may be included in golf head 14 and the slant pattern of a golf swing be obtained and examined with respect to time and the other parameters being measured. Of course, additional measurement elements require additional channels of communication, storage, and signal handling in general.

As stated, the strain gages employed may be of the simple battery energized variable resistance type, properly oriented, in which case they would provide variations in voltage with strain to transmitters 24 and 26 which may comprise simple voltage controlled oscillators to produce frequency modulation. Accelerometers employed for accelerometer 12 may be of the voltage generator type, such as a piezoelectric crystal or electro magnetic devices or be of variable resistivity type, in each event producing by conventional means variable imputs in modulation of F.M. transmitter 22. While F.M. modulation has been discussed up until this point, of course it is to be appreciated other types of modulation may in a like manner be employed in accordance with known techniques.

While a preferred embodiment of my invention has been described and shown by way of illustrative example, the invention is not to be so limited, as various modifications may be made of the described and other embodiments of the invention without departing from the scope of the invention, as defined by the appended claims.

I claim:
1. An athletic swing measurement system comprising:
(A) A hand held athletic club having a gripping portion and further comprising:
(1) an impact region adapted to strike a playing object;
(2) A handle region intermediate said gripping portion and said impact region;
(B) movement sensing means supported by at least one of said regions and responsive to motion of said athletic club for providing at least one electrical signal which is a continuous function of an element of movement of at least a portion of said one of said regions throughout periods of said motion;
(C) indicating means responsive to an input signal for registering a plot of input signal versus time;
(D) electrical signal transmission means responsive to at least one output of said movement sensing means for providing an input signal to said indicating means.

2. The measurement system set forth in claim 1, further comprising comparison means responsive to said signals from said indicating means and reference input signals for providing an output indicative of difference between said signals from said indicating means and said reference input signals.

3. The measurement system set forth in claim 1, further comprising means responsive to said input signal provided by said signal transmission means for electrically storing a plurality of said input signals and selectively supplying the stored signals to said indicating means.

4. The measurement system set forth in claim 3, wherein said plurality of said input signals occur simultaneously.

5. The measurement system set forth in claim 3, wherein said plurality of said input signals occur sequentially.

6. The measurement system set forth in claim 3, wherein said plurality of said input signals occur both simultaneously and sequentially.

7. The measurement system set forth in claim 1, wherein said electrical signal transmission means includes radio transmission means within said athletic club for transmitting signals modulated by said output of said movement sensing means, and further includes demodulation means remote from said athletic club and responsive to said radio transmission means for reproducing said output as an input to said indicating means.

8. The measurement system set forth in claim 7, wherein said radio transmission means comprises a system of frequency modulation.

9. An athletic swing measurement system comprising:
(A) a hand held athletic club comprising:
(1) a gripping region for gripping said club;
(2) an impact region adapted to strike a playing object;
(3) a handle region intermediate said gripping region and said impact region;
(B) movement sensing means supported by said impact region and responsive to motion of said athletic club for providing electrical signals which are continuous functions of changes in velocity of said impact region throughout the period of said motion;
(C) indicating display means responsive to input signals for providing graphical plots of input signals versus time;
(D) electrical signal transmission means responsive to the output of said movement sensing means for providing input signals to said indicating display means.

10. The measurement system set forth in claim 9, further comprising means responsive to said electrical signals provided by said signal transmission means for electrically storing said input signals and for selectively supplying the stored signals to said indicating display means.

11. A golf swing measurement system comprising:
(A) a golf club comprising:
(1) a gripping region for gripping said club;
(2) a club head region;
(3) a handle region intermediate said gripping region and club region;
(B) movement sensing means providing electrical signal outputs and comprising:
(1) an accelerometer embedded in said club head region for providing a first electrical output indicative of acceleration;
(2) a torsion indicating strain gage connected to said handle region adjacent said club head region for providing a second electrical output indicative of torsional movement of said handle region;
(3) a flex indicating strain gage connected to said handle region for providing a third electrical output indicative of flexure of said handle;
(C) indicating display means responsive to input signals for providing graphical plots of input signals versus time;
(D) display control means responsive to said first, second, and third outputs of said movement sensing means for selectively energizing said indicating display means;
(E) electrical signal transmission means responsive to said movement sensing means for transmitting said first, second, and third outputs to said display control means.

12. The measurement system set forth in claim 11, wherein said display control means includes signal storage and playback means for storing and subsequently playing back thru said indicating display means at least one of said first, second, and third outputs of said movement sensing means.

13. The measurement system set forth in claim 12, wherein said signal storage and playback means comprises a continuous loop magnetic recorder having record/playback transducers.

14. The measurement system set forth in claim 13, further comprising:
(A) trigger means responsive to an initial signal from said movement sensing means for recording a synchronizing pulse on said synchronizing magnetic track; and
(B) switching means responsive to said initial signal for coupling signal transfer of at least one of said first, second, and third outputs to a said record/playback transducer of said signal storage and playback means for a predetermined period for uncoupling said signal transfer to said record/playback transducer of said signal storage and playback means and coupling said transducer to an input of said display control means.

15. A golf club swing measurement system comprising:
(A) a golf club comprising:
(1) a gripping region;
(2) a club head region;
(3) a handle region intermediate said gripping region and said club head region and including sensing means for providing electrical output signals which are a function of relative movement of portions of said handle region;
(B) indicating display means responsive to input signals for providing graphical plots of input signals versus time;
(C) electrical signal transmission means responsive to said sensing means for providing input signals to said indicating display means.

16. The golf club swing measurement system set forth in claim 15, wherein said sensing means comprises means for providing output signals which are a function of flexure and torsion.

17. A golf club swing measurement system comprising:
(A) a golf club comprising:
(1) a gripping region;
(2) a club head region;
(3) a handle region intermediate said gripping region and said club head region and including a first sensing means for providing first electrical output signals which are a function of flex relative movement of portions of said handle region, and second sensing means for providing second electrical output signals which are a function of torsional movement of portions of said handle region;
(B) signal selector means responsive to a first and second input for selectively connecting said first and second inputs to an electrical output;
(C) electrical signal transmission means for coupling said first electrical output signals of said sensing means to said first input of said signal selector means and for coupling said second electrical output signals from said sensing means to said second input of said signal selector means;
(D) indicating display means responsive to signals from said output of said signal selector means for providing graphical plots of applied signals versus time.

18. The measurement system set forth in claim 17, wherein said sensing means comprises strain gages.

19. The measurement system set forth in claim 17, wherein said electrical signal means for coupling said first and second electrical output signals comprises radio transmission means within said golf club, and further includes demodulation means responsive to said radio transmission means, said demodulation means being positioned remote from said golf club.

20. A golf swing measurement system comprising:
(A) a golf club comprising:
(1) a gripping region for gripping said club;
(2) a club head region;
(3) a handle region intermediate said gripping region and club region;
(B) movement sensing means providing electrical signal outputs and comprising at least one of the following:
(1) an accelerometer embedded in said club head region for providing a first electrical output indicative of acceleration;
(2) a torsion indicating strain gage connected to said handle region adjacent said club head region for providing a second electrical output indicative of torsional movement of said handle region;
(3) a flex indicating strain gage connected to said handle region for providing a third electrical output indicative of flexure of said handle;
(C) recording means having a recording input and playback output for recording and playing back at least one of said first, second, and third electrical outputs;
(D) electrical signal transmission means responsive to said movement sensing means for transmitting at least one of said first, second, and third outputs to said recording means;
(E) filtering means responsive to said recording means for removing from at least one of said first, second, and third electrical outputs electrical signals not related to a complete swing of said golf club;

(F) data averaging means responsive to said filtering means for obtaining an average value of a plurality of cycles of at least one of said first, second, and third outputs;

(G) indicating means responsive to said averaging means for reading out as a function of time at least one of said average values.

21. The measurement system set forth in claim 20, further comprising comparison means responsive to said data averaging means for comparing outputs of each data averaging means with reference signals and indicating differences resulting from the comparison.

22. The measurement system set forth in claim 21, further comprising an analog to digital converter connected between said recording means outputs into a series of digital values with respect to time.

References Cited by the Examiner

UNITED STATES PATENTS

| | | | |
|---|---|---|---|
| 1,876,657 | 9/1932 | Fox | 73—380 |
| 2,299,722 | 10/1942 | Burns et al. | 73—88.5 X |
| 3,077,781 | 2/1963 | Silver | 73—465 |
| 3,157,148 | 11/1964 | Reed | 73—88.5 X |
| 3,182,508 | 5/1965 | Varju | 73—379 |

FOREIGN PATENTS 653,471 12/1962 Canada.

LOUIS R. PRINCE, *Primary Examiner.*

MICHAEL B. HEPPS, *Assistant Examiner.*